United States Patent [19]

Battaglia

[11] Patent Number: 5,383,958
[45] Date of Patent: Jan. 24, 1995

[54] DEAERATION SYSTEM

[75] Inventor: Joseph A. Battaglia, Forest Hills, Pa.

[73] Assignee: Westinghouse Electric Corporation, Pittsburgh, Pa.

[21] Appl. No.: 194,196

[22] Filed: Feb. 9, 1994

[51] Int. Cl.⁶ .............................................. B01D 19/00
[52] U.S. Cl. ........................................ 96/188; 95/256; 95/259; 96/201; 96/205
[58] Field of Search ................. 95/254, 255, 256, 259, 95/266; 96/188, 193, 201, 205, 218

[56] References Cited

U.S. PATENT DOCUMENTS

| | | | |
|---|---|---|---|
| 1,260,493 | 3/1918 | Wedge et al. | 96/201 |
| 2,115,453 | 4/1938 | Baker | 96/218 |
| 2,645,607 | 7/1953 | Allen | 96/205 |
| 4,816,044 | 3/1989 | Weigert et al. | 96/201 |
| 4,948,393 | 8/1990 | Hodson et al. | 95/256 |

FOREIGN PATENT DOCUMENTS 2198054  6/1988  United Kingdom ............... 95/266

*Primary Examiner*—Charles S. Bushey

[57] ABSTRACT

A water deaeration system has a pump in a supply pipe supplying water to a deaeration vessel. A recirculation pipe interconnecting a heat exchanger between the discharge side and the suction side of the supply pump heats a recirculated portion of the water flowing to the deaeration vessel. A vacuum pump having its suction side connected with the deaeration vessel and its discharge side connected to an air-water separator evacuates the air dissolved in the water and the separator then separates seal water and entrained water from the evacuated air. The vacuum pump has a water seal which is supplied by the separated water in the separator by a seal water pipe connected between the separator and the water seal via the hot side of the recirculation seal water heat exchanger. Heat energy introduced into the seal water by the vacuum pump is transferred to the supply water flowing to the deaeration vessel to be deaerated in order to more efficiently strip the air.

4 Claims, 1 Drawing Sheet

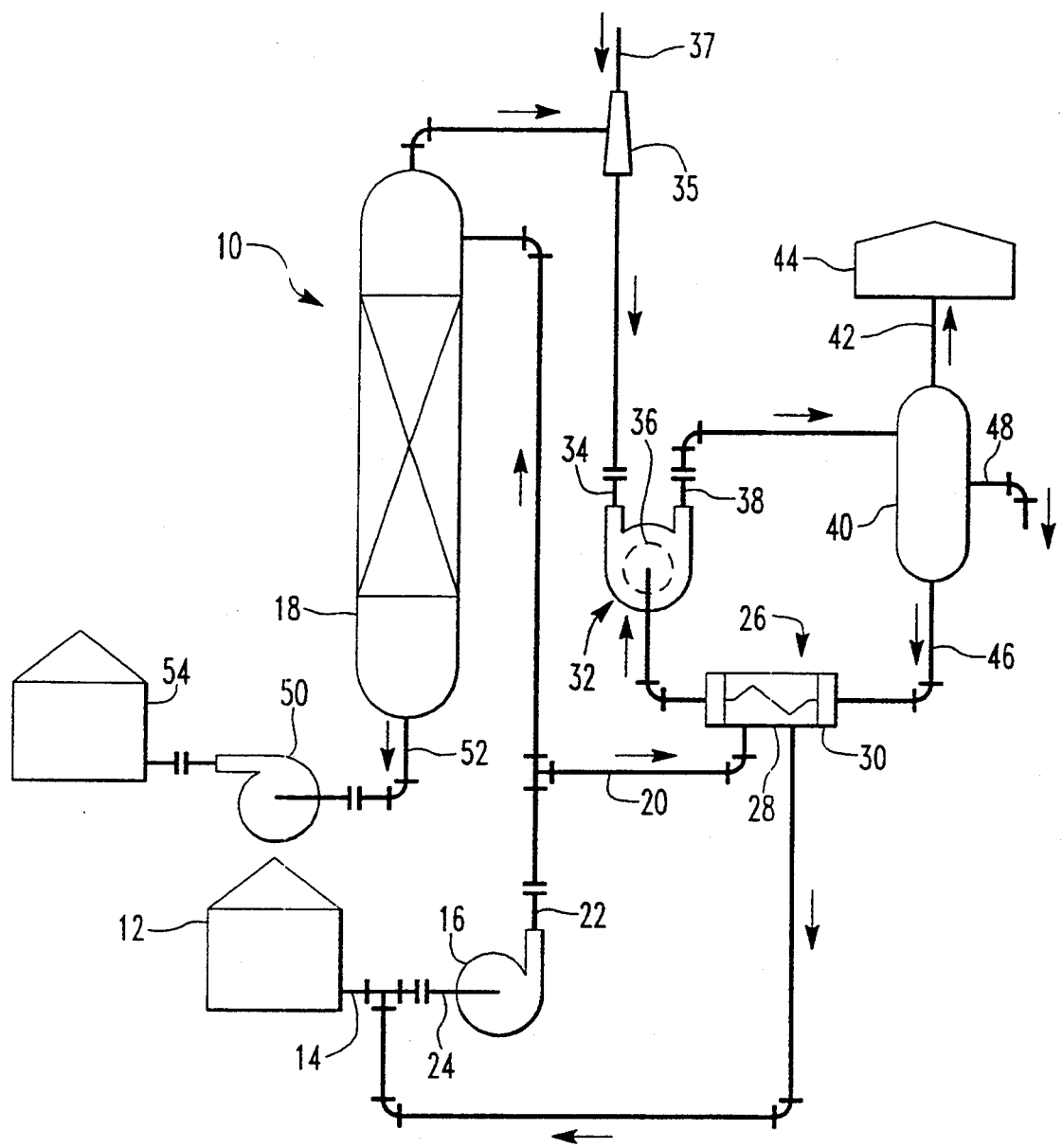

DEAERATION SYSTEM

BACKGROUND OF THE INVENTION

The invention relates to a method of deaerating water and, more particularly, to an energy-efficient method of deaerating water.

In the power, food, chemical and other processing industries, large quantities of deaerated water frequently are required to achieve product purity, for corrosion protection or for other processing reasons. Not infrequently, the deaerated water is stored in relatively large storage tanks having capacities ranging up to the hundreds of thousands of gallons. Although the water may meet specification requirements when originally introduced into the storage tanks and the tanks may be provided with air exclusion devices such as rubber diaphragms or floating roofs, nevertheless air may leak into the tanks if, e.g., the air exclusion devices have deteriorated over time.

To keep large quantities of deaerated water sufficiently pure, supplementary deaeration systems are often employed to assure that the water meets the process specification. A well known system employs vacuum deaeration to maintain the water specification wherein the water is introduced into a deaeration column operating near the vapor pressure of the water being deaerated. A water sealed mechanical vacuum pump is generally employed to draw the vacuum on the deaeration column by evacuating the air (together with dissolved and entrained water) from the water flowing through the column. The deaerated water may be recirculated back to the supply tanks or may be introduced into the process.

While such deaeration systems are generally effective, the art continues to search for more efficient processing improvements.

SUMMARY OF THE INVENTION

It is an object of the present invention to provide a more efficient deaeration system. It is a further object to provide a more energy efficient deaeration system.

With these objects in view, the present invention resides in a water deaeration system having a deaeration vessel which operates under a vacuum created by a mechanical vacuum pump. Supply piping extending from a source such as a supply tank and having an in-line pump such as a centrifugal pump is connected to the deaeration vessel for providing the water to be deaerated. Recirculation piping connected from the pump discharge side to the pump suction side recirculates a portion of the water through the cold side of a heat exchanger to heat the water flowing to the deaeration vessel. Preferably, the heat exchanger and the deaeration vessel are within a mechanical vacuum pump package.

The mechanical vacuum pump pumps air and entrained water from the deaeration vessel connected to its suction side to an air-water separator connected to its discharge side where most of the entrained water is separated from the air. The vacuum pump has a water seal for maintaining a vacuum. In operation, the vacuum pump generates a substantial amount of heat which is absorbed by the air and entrained water (and the water seal) as they flow through the pump. Seal water piping is connected between the separator and the water seal of the vacuum pump for providing a clean source of seal water to the vacuum pump. The hot side of the heat exchanger is connected in the seal water piping for cooling the seal water flowing back to the vacuum pump. Advantageously, the heat generated by the vacuum pump is employed to heat (and, therefore, more efficiently deaerate) the water supplied to the deaeration vessel.

BRIEF DESCRIPTION OF THE DRAWING

The invention as set forth in the claims will become more apparent from the following detailed description of a preferred embodiment thereof shown, by way of example only, in the accompanying flowsheet of a deaeration system incorporating the present invention.

DESCRIPTION OF THE PREFERRED EMBODIMENT

The flowsheet generally shows a deaeration system 10 for deaerating water from a storage vessel such as a water storage tank 12. The water is pumped through supply piping 14 by a supply pump 16 into a deaeration vessel 18. Recirculation piping 20 is connected between the discharge side 22 of the supply pump 16 and the suction side 24 of the supply pump 16. The recirculation piping 20 is connected with the cold side 28 of a heat exchanger 26 for healing the water and cooling a stream (which, as is discussed below, is a seal water stream) on the hot side 30 of the heat exchanger 26. The heat exchanger is a single pass countercurrent shell and tube heat exchanger with the seal water passing on the tube-side.

The supply pump 16 may be a centrifugal pump as shown. In plant scale facilities, the pump 16 may supply up to several hundred gallons per minute of water to the deaeration vessel 18. The recirculation stream in piping 20 may be about a tenth of the nominal flow rate through the supply piping 14 or more. The deaeration vessel 18 may be any suitable vessel for generating large water surface areas to facilitate the deaeration process, which is diffusion controlled. Thus, the vessel may be a stripping tower or column having packing and/or spray nozzles.

A mechanical vacuum pump 32 having a suction side 34 connected with the deaeration vessel 18 is employed to evacuate the dissolved air from the supply water and a small amount of water entrained with the air. The vacuum pump 32 has a conventional water seal 36 for maintaining the vacuum in the system. In addition, an air injector 35 connected with air piping 37 may be between the deaeration vessel 18 and the pump suction side 34 to obtain a deeper vacuum. In operation, a portion of the mechanical energy employed to create the vacuum heats the air, entrained water and seal water as they flow through the pump 32.

An air-water separator 40 connected to the discharge side 38 of the vacuum pump 32 is employed to separate at least some, and preferably most, of the entrained water from the air. Any suitable separator design may be employed. The air may then be vented through a line 42 to a vent 44 or otherwise discharged. Seal water piping 46 connected between the separator 40 and the water seal 36 of the vacuum pump 32 via the hot side 30 of the heat exchanger returns cooled seal water to the vacuum pump 32. Advantageously, heat from the vacuum pump 32 is efficiently recovered and utilized to heat the water to the deaeration vessel 18. A small portion of the circulating water may be discharged through pipe 48 if the level of water in the separator 40 becomes excessive due to, e.g., condensation of entrained water in the vacuum pump inlet 34.

The deaerated water from the deaeration vessel 18 may be pumped by a pump 50 in a pipe 52 to a storage vessel 54 (as is shown), recycled back to the storage vessel 12 (not shown) or pumped to the process (not shown).

While a present preferred embodiment of the present invention has been shown and described, it is to be understood that the invention may be otherwise variously embodied within the scope of the following claims invention.

I claim:

1. A water deaeration system, comprising:
    a deaeration vessel for deaerating air dissolved in water;
    supply piping connected with the deaeration vessel for supplying water thereto;
    a supply pump in the supply piping for pumping the water to the vessel, the pump having a suction side and a discharge side;
    recirculation piping connected between the pump discharge side and the pump suction side for recirculating a portion of the water from the discharge side to the suction side;
    a heat exchanger for utilizing the water as a cooling source, the heat exchanger having a cold side and a hot side, the cold side connected with the recirculation piping;
    a vacuum pump having a water seal for creating a vacuum, the vacuum pump having a suction side connected with the deaeration vessel for evacuating the air and water entrained therein from the deaeration vessel and having a discharge side;
    an air-water separator connected with the discharge side of the vacuum pump for separating the entrained water and seal water from the evacuated air; and
    seal water piping connected between the separator and the water seal of the vacuum pump and with the hot side of the recirculation heat exchanger connected therein;
    whereby cooled separated water is returned to the vacuum pump seal and heated water is supplied to the deaeration vessel.

2. The water deaeration system of claim 1, wherein the heat exchanger is a shell and tube heat exchanger with the seal water on the tubeside.

3. The water deaeration system of claim 2, wherein the heat exchanger is a countercurrent exchanger with single passes on the shell side and the tube side.

4. The water deaeration system of claim 3, wherein the suction side of the vacuum pump is connected to the deaeration vessel via an air injector.

* * * * *